April 27, 1971  G. PRISLAN  3,576,612
APPARATUS FOR THE MANUFACTURE OF FLOAT GLASS WITH A HEATED TWEEL
Filed Jan. 25, 1968  3 Sheets-Sheet 1
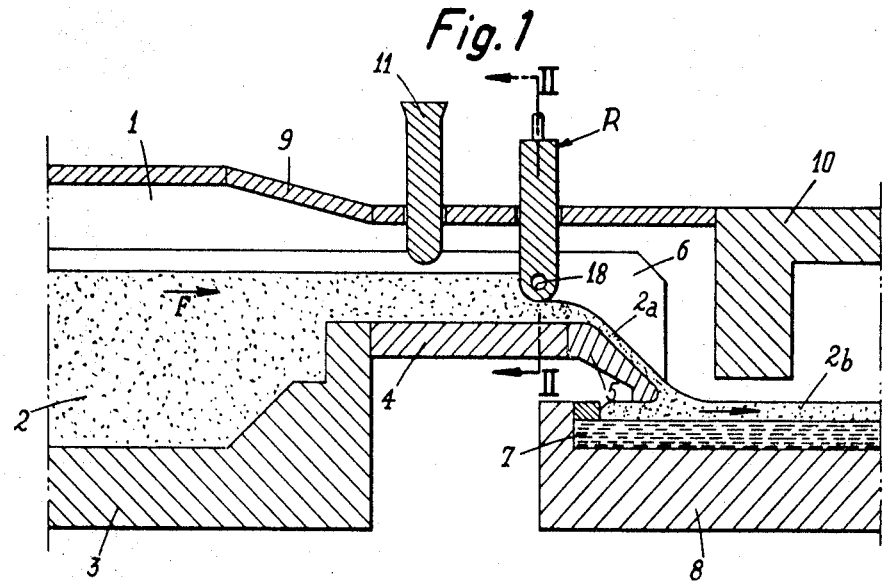
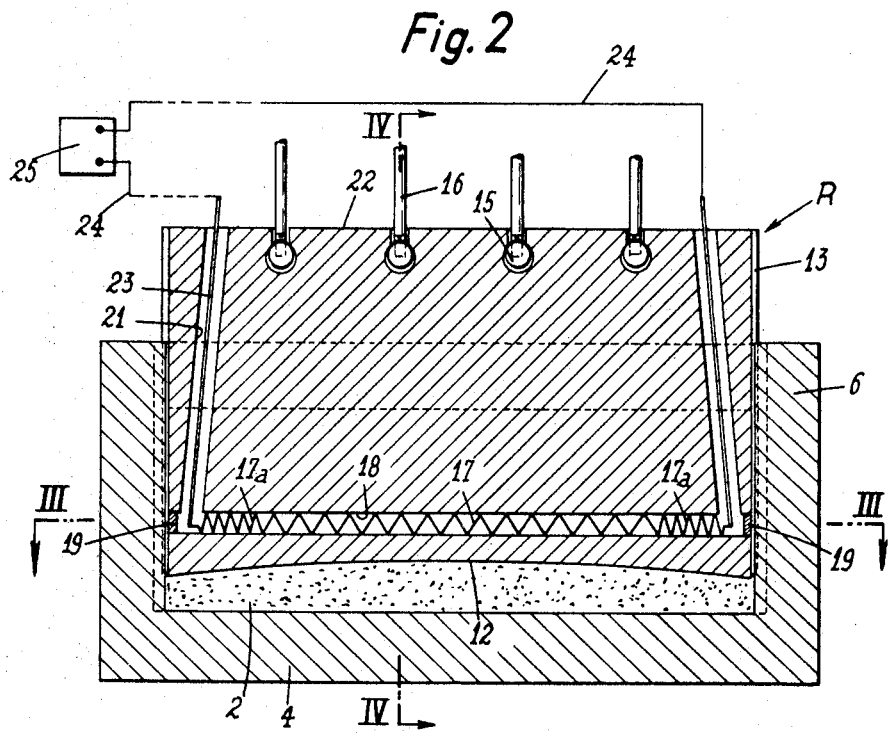
INVENTOR
GEORGES PRISLAN
By Young & Thompson
ATTYS.

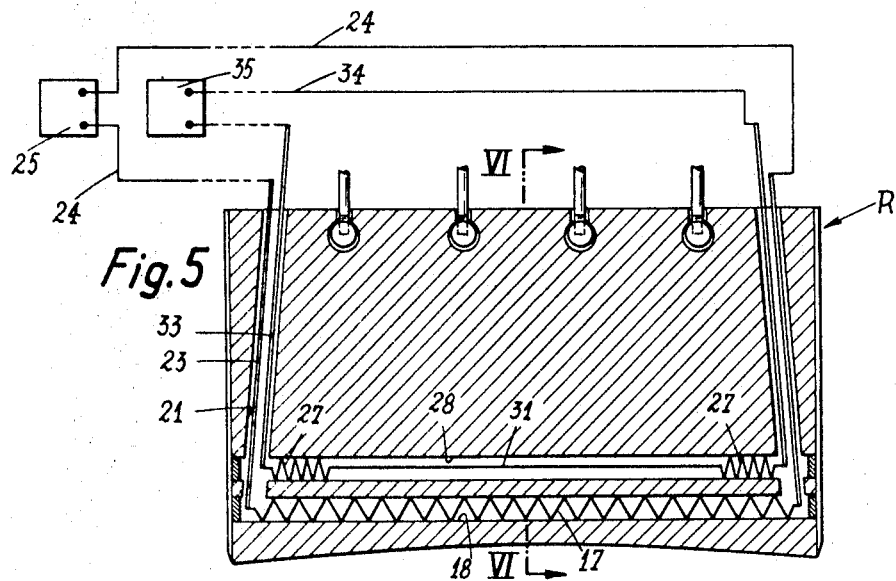
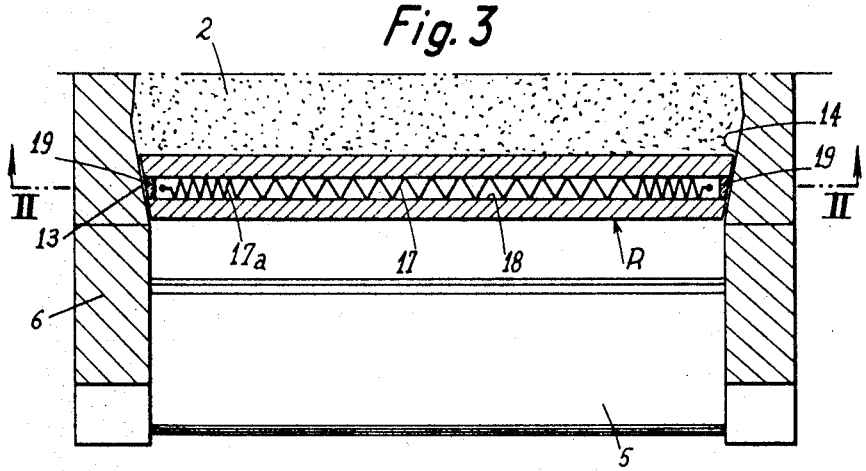
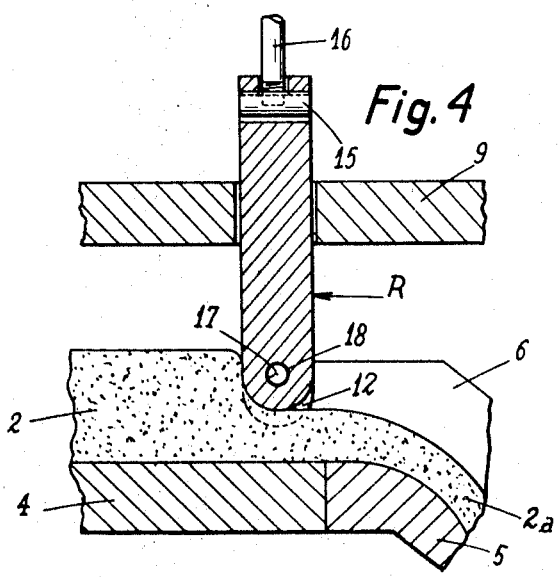

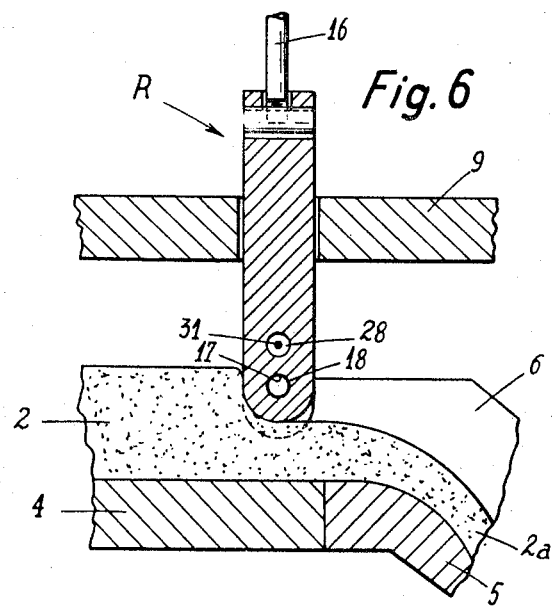
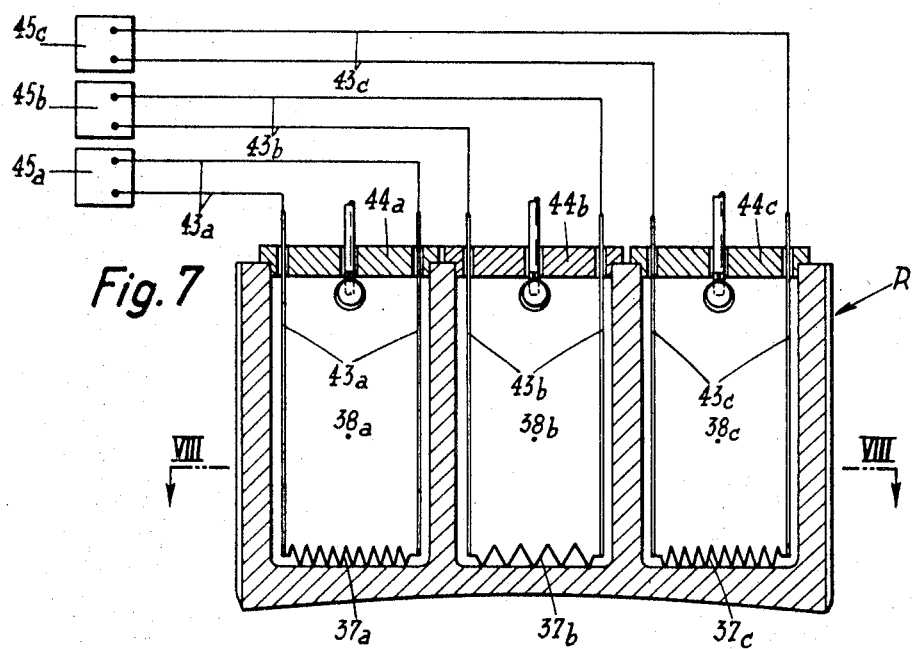
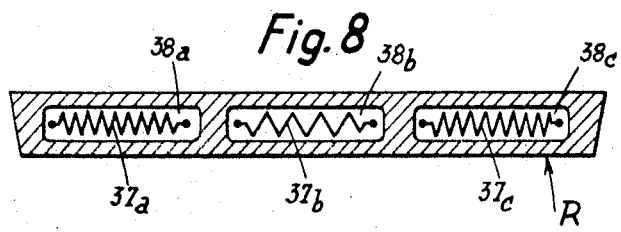

3,576,612
APPARATUS FOR THE MANUFACTURE OF FLOAT
GLASS WITH A HEATED TWEEL
Georges Prislan, Boussois, France, assignor to Boussois
Souchon Neuvesel, Paris, France
Filed Jan. 25, 1968, Ser. No. 700,398
Claims priority, application France, Feb. 9, 1967,
94,253
Int. Cl. C03b 18/02
U.S. Cl. 65—182                                5 Claims

ABSTRACT OF THE DISCLOSURE

Apparatus for the manufacture of flat glass by flowing and solidification of a layer of glass which floats on a bed of molten metal, comprising a spillway for the molten glass which serves to connect the tank of the melting furnace to the tank which contains the bath of molten metal and a tweel for regulating the flow of glass and consisting of a refractory panel of adjustable height which is mounted transversely within said spillway. The tweel has at least one cavity in which is housed at least one electric heating resistor fitted with connection members for the supply of current.

---

This invention relates to improvements in apparatus for the manufacture of flat glass which makes use of a known process whereby a layer of molten glass which is produced in a melting furnace is conveyed to the surface of a bath of liquid metal such as molten tin on which said layer is displaced.

In apparatus of this type, the furnace for melting the glass is connected by means of a channel to a spillway over which the molten glass flows onto the surface of the molten metal bath contained in a tank. The molten glass layer which floats on the metal moves along the tank as it cools, thus becoming sufficiently rigid to be discharged at the other end of the tank in the form of a ribbon.

In apparatus of this kind, the rate of flow of the glass which is admitted into the bath of molten metal is regulated by means of a moving panel—or tweel—which is designed to slide in vertical motion and is fitted in the channel. The function of said tweel is to control the delivery of the molten glass to the molten metal bath.

The improvements contemplated by the invention are concerned with the constructional design of the regulating tweel for apparatus of the type under consideration.

The tweels for regulating glass flow which are employed at the present time in the spillways of the apparatus mentioned above suffer from the following disadvantage: when a tweel is immersed in the molten glass, as the refractory material of which it is formed absorbs the heat of the molten glass with which it is in contact and dissipates this heat in the surrounding atmosphere and equipment. The glass which is in contact with the tweel is thus cooled and forms a viscous skin. The presence of this skin is doubly troublesome: in the first place, it is liable to cause mechanical erosion of the tweel to a greater extent than would be the case with a hotter, and therefore more fluid, glass; in the second place, the glass has a tendency as a result of the presence of the skin to retain the impressions left by eventually occurring asperities on the surface of the tweel, thus causing optical defects in the manufactured products. Since the thickness of the skin increases as the thermal conductivity of the refractory material increases, the use of some refractory materials which have good heat conductivity is precluded so that tweel panels are usually manufactured only from materials of the sillimanite type.

However, another disadvantage frequently met with in tweels of this type in which the surfaces in contact with the glass are initially polished lies in the fact that, after a few days of use, the surface polish of the tweel which is subjected to erosion by the molten glass is destroyed and a large number of fissures and striae are formed. The surface of the tweel then acts on the glass in much the same manner as a rake, thereby imparting a substantial degree of optical deformation to the manufactured product. In the method under consideration, this is a highly detrimental condition, since the outer layer of the glass must have an excellent surface condition. Moreover, the molten glass partially dissolves some constituents of the refractory material. This results in the formation of defects in the finished product which take the form of fine lines and sometimes of small gas bubbles, the bubbles being particularly troublesome when the finished product has to be silvered.

Finally, the tweel which is formed of sillimanite-base material becomes rapidly damaged and must be frequently changed; this replacement is made all the more costly as it entails momentary stoppage of production.

The aim of this invention is to put aside thre disadvantages mentioned above by making it possible in particular to fairly limit and even to eliminate the skin which is formed by the molten glass bath in contact with the tweel through a good choice of the materials constituting the tweel, such a choice being in turn made possible by the special structure of said tweel.

In accordance with the invention, apparatus for the manufacture of flat glass, in which a layer of molten glass is flowed onto a bath of molten metal, comprises a spillway for the molten glass connecting a melting furnace with a tank containing a bath of molten metal and a tweel for regulating the flow of glass from the furnace onto the molten metal bath, said tweel comprising a vertically adjustable refractory panel mounted transversely within said spillway and having a lower portion in contact with the molten glass, said panel defining at least one internal cavity, at least one electric heating resistor housed within said cavity adjacent to said lower portion of the tweel, said heating resistor having means for connection to a supply of current.

It has in fact been proved by experience that, as a result of the thermal flux which is released into the glass of the spillway by the refractory panel by means of the self-contained heating means with which said panel is provided, the skin which is formed in contact with the register can practically be eliminated.

The arrangement of a self-contained heating means which is thus mounted in the tweel provides the interesting possibility of fabricating the tweel panel from a refractory material which possesses the requisite properties of resistance to erosion or corrosive attack by the glass, even if this material is otherwise endowed with a coefficient of thermal conductivity which would normally preclude its use in the case of a conventional tweel.

In particular, the invention provides for the use of refractory materials having a zircon base and those obtained by fusion casting and generally known as fusion-cast materials. Among these materials, mention can be made of those having a base of alumina, or those having a base of alumina, zirconia and silica.

Preferably the heating resistor can extend in a direction substantially parallel to the lower edge of the tweel and in the vicinity of this latter.

In a particularly advantageous embodiment of the invention, the electric heating resistor is so designed that the heat output per unit area of the panel is of higher value in the vicinity of the edges than in the central portion of the panel.

This technical effect can be achieved by mounting within the panel a helical resistor having a pitch which is smaller in the vicinity of the edges than in the central portion.

In a preferred embodiment of the invention, the differential heating of the tweel is carried out both by a main heating resistor which extends substantially from one edge of the panel to the other and by auxiliary heating resistors which are disposed solely in the vicinity of the lateral edges.

Preferably, means are provided for regulating the electric power which is supplied to each resistor, for example by supplying said resistors from independent current sources. When the tweel comprises more than one heating resistor, the temperature of the glass which is in contact with the tweel can accordingly be modified in a differential manner. As a consequence, it thus becomes possible both to facilitate the flow of the molten glass stream beneath the tweel and to render its transverse temperature uniform, which is favorable to its subsequent processing.

Further properties and advantages of the invention will become apparent from the following description, reference being made to the accompanying drawings which are given by way of non-limitative example, and in which:

FIG. 1 is a transverse sectional view on a small scale showing the tweel in the service position at the entrance of a spillway.

FIG. 2 is a frontal sectional view of the tweel on a larger scale, this view being taken along the line II—II of FIG. 1.

FIG. 3 is a corresponding sectional plan view taken along the line III—III of FIG. 2.

FIG. 4 is a transverse sectional view on the same scale and taken along the line IV—IV of FIG. 2.

FIG. 5 is a sectional view which is similar to FIG. 2 and showing a front view of the tweel in accordance with an alternative embodiment.

FIG. 6 is a transverse sectional view taken along the line VI—VI of FIG. 5 and showing the tweel in operating position.

FIG. 7 is a sectional view which is similar to FIG. 2 and showing a third embodiment of the tweel alone.

FIG. 8 is a horizontal sectional view taken along the line VIII—VIII of FIG. 7.

Referring now to FIG. 1 of the accompanying drawings, there is shown a part of an apparatus for the manufacture of flat glass by formation of a layer of glass which floats at the surface of a bath of molten metal.

More specifically, there is shown at 1 (FIG. 1) a covered channel which is joined to a melting furnace (not shown) over the bottom 3 of which a mass 2 of molten glass is conveyed in the direction of the arrow F towards a spillway which is formed by a chute 4 and a lip 5 provided with lateral flanges 6. A layer of molten glass 2a flows over the lip 5 onto the surface of a bath of molten tin 7 contained in a tank 8, only the front end of which is shown in the drawings. The molten glass thus spreads out so as to form a layer 2b. The channel 1 and the spillway are covered by a roof 9 which is connected to a further roof 10 which covers the tank 8.

A shut-off tweel 11 which traverses the roof 9 makes it possible in the lowered position to interrupt the flow of molten glass; during normal production, said tweel is held in the raised position and does not come into contact with the glass.

There is provided downstream of the tweel 11 a second tweel R which is also slidably mounted in the roof 9 by way of a suitable slot for vertical adjustment so as to penetrate into the molten glass to a greater or lesser extent depending on whether it is desired either to reduce or to increase the rate of flow of the molten glass which forms the layer 2a.

The tweel R is constituted by a panel having a substantially rectangular contour but a slightly arcuate lower edge 12. It has chamfered edges 13 which bear against oblique faces 14 of the flanges 6. The tweel R is attached by means of stirrup-pieces 15 to suspension rods 16 which are joined to a beam (not shown) so that the tweel can consequently be adjusted for height. When the tweel R is in service, the edges 13 bear against the faces 14 as a result of the hydrostatic pressure of the glass.

In accordance with the present invention, the tweel R includes a heating resistor 17 housed within a longitudinal cavity constituted by a cylindrical tunnel 18 which is formed close to the lower edge 12. In order that the heating resistor 17 can be fitted in position, the cavity 18 opens at both ends at the edges 13, the corresponding bores being closed by means of added plugs 19.

In order to establish the necessary supply connections to the element 17, the tunnel 18 is served by two oblique ducts 21 which are inclined inwardly from the edges 13 and terminate at the upper edge 22 of the panel. The inclination of the ducts 21 is intended to prevent weakening of the panel in the vicinity of the edges 13. Provision is made within the ducts 21 for rigid conductors 23 which terminate in flexible leads 24 connected to an electric power supply 25 which is provided with means (not shown) for the purpose of regulating the electric power supplied to the resistor 17.

In the particular embodiment herein described, the resistor or heating element 17 consists of a wire having constant resistivity which is wound in a helix and the turns of which are distributed symmetrically with respect to the plane of symmetry of the tweel, but not uniformly across the width of the tweel. In fact, the turns are located at progressively closer intervals from the center towards the ends 17a of the heating element.

According to another feature of the invention which is governed by the presence of the heating element 17, the panel of the tweel R is fabricated from a fusion-cast refractory material which, by way of example, may have a thermal conductivity of the order of 3.8 Kcal/h./m.$^2$ and per ° C./m.

Under operating conditions, the electric power delivered by the supply 25 to the heating element 17 is regulated so as to counterbalance at least the heat losses by conductivity of the refractory material which would be caused by the tweel R if its own heating means were not in action. In fact, by reason of its relatively high thermal conductivity, the tweel R absorbs heat from the molten glass with which it is in contact at a temperature of the order of 1050° C. and to transfer said heat to the cold source constituted by the ambient air which surrounds the plant. This heat transfer of air is carried out either directly through the top portion of the tweel which extends above the roof 9 or through the intermediary of its lateral faces which are applied against the flanges 6, said flanges in turn exposed to the surrounding air.

It is thus possible to prevent the formation of a skin on the glass which is in contact with the tweel R.

By increasing the electric power, the thermal power which is yielded by the tweel R to the mass of molten glass 2 can be increased accordingly. It is thus possible to modify the temperature of the molten glass which is in contact with the tweel; in particular, it is possible to reheat the glass and therefore to render it more fluid, thereby reducing its frictional contact with the tweel and facilitating its flow motion.

By reason of the longitudinal variation of the pitch of the heating element 17, the heating effect is of greater intensity at the edges than in the central portion of the panel. This arrangement is useful since it serves to compensate for the differences in thermal conductivity which exist within that portion of the refractory material which is located beneath the axis of the heating element 17 by reason of the lateral overthicknesses of the tweel which are due to the arcuate configuration of its lower edge 12, the portions of greater thickness being consequently heated to a greater extent. Furthermore, this differential heating makes it possible to compensate for heat losses within the molten glass which is in contact with the tweel, such heat losses being more substantial near the edges than at the center by reason of the proximity of the vertical flanges 6 which tend to dissipate the heat to the exterior of the apparatus.

By way of indication, it has proved possible to obtain advantageous results with a tweel which is designed as herein described and has a width of 1 m., a height of 0.60 m., a thickness of 0.12 m. and a rise of arch of 18 mm. along its lower edge 12. The power of the supply source 25 was designed to dissipate into the heating element 17 a power of the order of 5 kw., the minimum power required to compensate for thermal losses by conduction being of the order of 880 w.

In the embodiment of FIGS. 5 and 6, the main heating element 17 is of constant pitch but provision is made above the tunnel 18 for a second tunnel 28 which is closed by plugs 29 and traversed by the oblique ducts 21. There are placed within the tunnel 28 two auxiliary heating elements 27 having a constant pitch and housed in the vicinity of the ends of said tunnel. Said elements are interconnected by means of a conductor 31 which can consist of a lead wire or of unwound turns of the heating elements 27. Current is supplied through conductors 33 which are housed within the ducts 21. Preferably, the conductors 33 are insulated from the conductors 23, this result being obtained by fitting each conductor, for example, within a tube of alumina. The conductors 33 are connected by means of flexible leads 34 to a supply source 35 which is separate from the source 25.

As a result of the independence of the sources 25 and 35 and by virtue of a suitable setting of these latter, it is possible to heat the elements 17 and 27 separately, thereby producing a varied temperature distribution within the molten glass which is in contact with the tweel R so that, for example, the glass may be either hotter at the center than at the edges or conversely, or alternatively at a practically uniform temperature throughout.

The tweel R of FIGS. 7 and 8 is, for example, fabricated from refractory material having a zircon base obtained by slip casting in a mold which may be of plaster, for example, followed by drying and baking. In this version, three juxtaposed compartments 38a, 38b, 38c respectively are formed within the thickness of the panel so as to accommodate heating elements 37a, 37b, 37c which are in contact with the bottom of said compartments and connected to separate sources 45a, 45b, 45c by means of pairs of conductors 43a, 43b, 43c which pass through detachably refractory covers 44a, 44b, 44c provided for the purpose of closing the corresponding compartments.

The lateral elements 37a, 37c have turns which are spaced at closer intervals than the central heating element 37b, thus serving to enhance the dissipation of heat of the panel in the vicinity of the edges. In any case, the supply sources 45a, 45b, 45c permit independent regulation of the working characteristics of the heating elements.

Among the noteworthy advantages of this embodiment of the invention are the facts that the electric heating elements can readily be replaced without removing the tweel and therefore without any stoppage of production, and also the relatively lightweight of the tweel which has a hollow structure.

It is apparent that the invention is not limited to the embodiment hereinabove described but extends to any or all alternative forms of construction which are within the capacity of anyone versed in the art. Thus, the panels could be fitted with electric heating elements of the non-wound type and especially with rod-type elements. Similarly, the temperature regime and resistance loads can be regulated by means of thermocouples mounted within the panel.

What I claim is:

1. An apparatus for the manufacture of flat glass, in which a layer of molten glass is flowed onto a bath of molten metal, comprising a spillway for the molten glass connecting a melting furnace with a tank containing a bath of molten metal and a tweel for regulating the flow of glass from the furnace onto the molten metal bath, said tweel comprising a vertically adjustable panel with a lower edge mounted transversely within said spillway and having a lower portion in contact with the molten glass, said panel being of a refractory material which affords resistance to erosion and corrosion and defining at least one internal cavity closed such that only the exterior of said lower portion is in contact with the molten glass, and at least one electric heating resistor housed within said cavity and extending in a direction substantially parallel to the lower edge of said panel and in the vicinity of said edge adjacent said lower portion, said heating resistor having means for connection to a supply of current.

2. An apparatus as claimed in claim 1, wherein said heating resistor is helically wound and has turns which are more closely spaced in the vicinity of the lateral edges of the panel than in the central portion thereof.

3. An apparatus as claimed in claim 1, wherein a main heating resistor extends substantially from one edge of the panel to the other and auxiliary heating resistors are disposed in the vicinity of said edges.

4. An apparatus as claimed in claim 1, wherein the tweel defines a tunnel constituting said internal cavity, said tunnel extending substantially parallel to the lower edge of the panel and in the vicinity of said edge.

5. An apparatus as claimed in claim 1, wherein the tweel defines a compartment constituting said internal cavity, said compartment extending from the top edge to the vicinity of the lower edge of the panel.

References Cited
UNITED STATES PATENTS

| | | | |
|---|---|---|---|
| 2,119,949 | 6/1938 | Blau et al. | 65—337UX |
| 3,442,636 | 5/1969 | Kita et al. | 65—182 |
| 3,348,937 | 10/1967 | Plumat | 65—99 |
| 3,486,876 | 12/1969 | Augustin et al. | 65—182 |

S. LEON BASHORE, Primary Examiner

J. B. HARDAWAY, Assistant Examiner

U.S. Cl. X.R.

13—6; 65—356